UNITED STATES PATENT OFFICE.

WILLIAM T. ELDRIDGE, OF SUGAR LAND, TEXAS, ASSIGNOR TO IMPERIAL SUGAR COMPANY, OF SUGAR LAND, TEXAS, A CORPORATION OF TEXAS.

STOCK FOOD.

1,089,630. Specification of Letters Patent. Patented Mar. 10, 1914.

No Drawing. Application filed December 2, 1912. Serial No. 734,562.

*To all whom it may concern:*

Be it known that I, WILLIAM T. ELDRIDGE, a citizen of the United States, residing at Sugar Land, in the county of Fort Bend and State of Texas, have invented certain new and useful Improvements in Stock Food, of which the following is a specification.

This invention relates to improvements in stock foods, and has for its primary object the production of what may be properly styled a perfectly balanced ration, equally useful in connection with the fattening of cattle and hogs, and the building up of working stock.

The invention comprehends also a stock food wherein certain by-products can be used with marked success; a raw stock food which will not sour, mold or sprout and which can therefore be stored or used at long intervals without deterioration, and finally, a food comprising in its composition ingredients which, in association with other ingredients, will represent a stock food highly beneficial, inexpensive and substantially free from deteriorating properties.

The invention contemplates the provision of a food which will be less expensive than foods consisting entirely of whole or mixed grains, and which will have the wholesome quality attributed to the use of molasses, commonly styled "blackstrap," which, owing to its nutritious character, is well recognized as a most desirable constituent for a stock food.

The use of molasses in substantial quantities has heretofore been handicapped or prevented by reason of the laxative properties of this substance, resulting in harmful bowel trouble. After a long period of experimenting, culminating in successful, practical demonstration, I have discovered that by combining the molasses and the other food constituents, to be herein later referred to, with a very small proportion of peat, then the final product is satisfactory in every way, resulting invariably in an improvement of the stock to which the food is given, and preventing those diseases so prevalent among stock and so expensive to the owners thereof; and, in fact the food has been proven to exert curative results in cases of colic. Another important advantage resides in the fact that an animal feeding on any amount of the food of which it will partake, will not founder.

I recognize the fact that others have heretofore attempted to combine in a food, large proportions of peat as a food constituent, but this is not satisfactory because of the fact that peat is not generally regarded as a concentrated food stuff. As distinguished from this idea, however, I use the peat in a very small proportion, merely for its modifying results to counteract the laxative quality of the molasses and to prevent the generation of harmful gases in the stock, practice having shown that the proportion of peat employed by me is helpful and has substantially the same effect on an animal as charcoal has on the human body,—acting as a blood purifier.

With the foregoing understanding of the characteristics of my improved food, its composition and method of production may now be understood.

Assuming the final product to be of one hundred parts, I employ the following ingredients in the proportions stated, to wit: Blackstrap molasses 50%, cotton seed hulls 20%, alfalfa meal 20%, cotton seed meal 5%, peat 5%.

The foregoing is particularly well adapted for a horse food and while I find it particularly desirable to preserve the proportions of molasses and peat, in feed for cattle and hogs the proportions of the remaining food constituents may be varied somewhat, as for example in cattle food, cotton seed hulls to the extent of 30% may be employed, reducing the alfalfa meal to 10%; and in the case of a food for hogs the cotton seed meal may be employed to the extent of 5% and rice bran to the extent of 25%, and alfalfa meal to the extent of 15%.

The process of manufacture involves the feeding of the various ingredients, with the exception of the molasses, from separate sources of supply, into a common receiver, where they are thoroughly mixed and blended while in a dry condition and in the absence of heat, following which the dry cold mixture is discharged into another mixing chamber into which the molasses is gradually fed, and the whole thoroughly mixed together still in the absence of heat, until the perfected product is obtained, the same being a dry mass having a tendency to adhere as a solid, substantially devoid of stickiness and easily crumbled and broken up. Immediately upon the termination of the method to which I have alluded, the food may be directly fed into paper or cloth bags or other devices for transportation or use, this being enabled by the cold process involving the mixing together of the food constituents, including the molasses with the peat, in the natural condition of the same.

It is to be understood that the materials designated as "cotton seed hulls" and "alfalfa meal" may be substituted for other materials, and also in lieu of the cotton seed meal other oily substance may be employed in the general mixture.

The food thus produced is one wherein the above stated objects are obtained, and is also of that character pleasing to the taste and readily satisfies the appetite of the animal.

I claim:—

1. A stock food consisting of a divided fibrous, uncooked alimentary base, such as cotton seed hulls and alfalfa meal, a low-grade molasses, in proportion greater than the proportion of any of the other materials, a relatively small portion of oily substance such as cotton seed meal, and a minor portion of peat.

2. A stock food comprising approximately 20 parts cotton seed hulls, 20 parts alfalfa meal, a small percentage of cotton seed meal, a low grade molasses in proportion greater than the proportion of any of the other materials, and a minor part of peat.

In testimony whereof I affix my signature in presence of two witnesses.

WILLIAM T. ELDRIDGE.

Witnesses:
 I. H. KEMPNER,
 A. M. WAUGH.